United States Patent
Brunty et al.

(12) 
(10) Patent No.: US 10,648,270 B2
(45) Date of Patent: May 12, 2020

(54) RISER ASSIST FOR WELLSITES

(71) Applicant: U.S. Well Services, LLC, Houston, TX (US)

(72) Inventors: Jeremy Brunty, Houston, TX (US); Randall Kimbler, Houston, TX (US); Dominic Chero, Houston, TX (US); Andrew Frame, Houston, TX (US); Robert Kurtz, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/570,331

(22) Filed: Sep. 13, 2019

(65) Prior Publication Data

US 2020/0088005 A1 Mar. 19, 2020

Related U.S. Application Data

(60) Provisional application No. 62/731,501, filed on Sep. 14, 2018.

(51) Int. Cl.
*E21B 19/06* (2006.01)
*E21B 33/068* (2006.01)
(Continued)

(52) U.S. Cl.
CPC ............ *E21B 33/068* (2013.01); *B66C 13/06* (2013.01); *F16F 15/023* (2013.01)

(58) Field of Classification Search
CPC ............................... B66C 13/06; F16F 15/023
(Continued)

(56) References Cited

U.S. PATENT DOCUMENTS 1,656,861 A 1/1928 Leonard
1,671,436 A 5/1928 Melott
(Continued)

FOREIGN PATENT DOCUMENTS

CA 2406801 11/2001
CA 2707269 12/2010
(Continued)

OTHER PUBLICATIONS

UK Power Networks—Transformers to Supply Heat to Tate Modern—from Press Releases May 16, 2013.
(Continued)

*Primary Examiner* — Paul T Chin
(74) *Attorney, Agent, or Firm* — Hogan Lovells US LLP

(57) ABSTRACT

An apparatus and associated method is disclosed for a riser hanging system. The apparatus includes a first elongated member with a provision for a first external mechanical coupling at a distal location on the first elongated member. A second elongated member is mechanically coupled to the first elongated member at proximal locations on the first elongated member and the second elongated member. A third member is mechanically coupled to a first portion of the first elongated member. The third member includes a fourth member to move through at least a second portion of a length of the second elongated member. Mechanical couplers associated with the second elongated member are provided for a second external mechanical coupling of the riser to the apparatus. The riser may be hoisted using the apparatus for better control during coupling to the wellhead.

15 Claims, 6 Drawing Sheets

(51) Int. Cl.
  *B66C 13/06* (2006.01)
  *F16F 15/023* (2006.01)
(58) Field of Classification Search
  USPC ............ 294/67.5, 86.14; 166/85.1, 70, 77.51
  See application file for complete search history.

(56) References Cited

U.S. PATENT DOCUMENTS

| | | | |
|---|---|---|---|
| 2,004,077 A | 6/1935 | McCartney | |
| 2,183,364 A | 12/1939 | Bailey | |
| 2,220,622 A | 11/1940 | Aitken | |
| 2,248,051 A | 7/1941 | Armstrong | |
| 2,407,796 A | 9/1946 | Page | |
| 2,416,848 A * | 3/1947 | Rothery | B66F 13/00 248/170 |
| 2,753,940 A | 7/1956 | Bonner | |
| 3,061,039 A | 10/1962 | Peters | |
| 3,066,503 A | 12/1962 | Fleming | |
| 3,302,069 A | 1/1967 | Webster | |
| 3,334,495 A | 8/1967 | Jensen | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,881,551 A | 5/1975 | Terry | |
| 4,037,431 A | 7/1977 | Sugimoto | |
| 4,100,822 A | 7/1978 | Rosman | |
| 4,151,575 A | 4/1979 | Hogue | |
| 4,226,299 A | 10/1980 | Hansen | |
| 4,265,266 A | 5/1981 | Kierbow et al. | |
| 4,432,064 A | 2/1984 | Barker | |
| 4,442,665 A | 4/1984 | Fick et al. | |
| 4,456,092 A | 6/1984 | Kubozuka | |
| 4,506,982 A | 3/1985 | Smithers et al. | |
| 4,512,387 A | 4/1985 | Rodriguez | |
| 4,529,887 A | 7/1985 | Johnson | |
| 4,538,916 A | 9/1985 | Zimmerman | |
| 4,676,063 A | 6/1987 | Goebel et al. | |
| 4,759,674 A * | 7/1988 | Schroder | B25J 18/02 414/146 |
| 4,793,386 A | 12/1988 | Sloan | |
| 4,845,981 A | 7/1989 | Pearson | |
| 4,922,463 A | 5/1990 | Del Zotto et al. | |
| 5,006,044 A | 4/1991 | Walker, Sr. | |
| 5,025,861 A | 6/1991 | Huber et al. | |
| 5,050,673 A * | 9/1991 | Baldridge | E21B 7/02 166/291 |
| 5,130,628 A | 7/1992 | Owen | |
| 5,131,472 A | 7/1992 | Dees et al. | |
| 5,172,009 A | 12/1992 | Mohan | |
| 5,189,388 A | 2/1993 | Mosley | |
| 5,366,324 A * | 11/1994 | Arlt | E21B 19/006 405/195.1 |
| 5,422,550 A | 6/1995 | McClanahan | |
| 5,548,093 A | 8/1996 | Sato | |
| 5,590,976 A | 1/1997 | Kilheffer et al. | |
| 5,655,361 A | 8/1997 | Kishi | |
| 5,736,838 A | 4/1998 | Dove et al. | |
| 5,755,096 A | 5/1998 | Holleyman | |
| 5,790,972 A | 8/1998 | Kohlenberger | |
| 5,865,247 A | 2/1999 | Paterson | |
| 5,879,137 A | 3/1999 | Yie | |
| 5,894,888 A | 4/1999 | Wiemers | |
| 5,907,970 A | 6/1999 | Havlovick et al. | |
| 6,138,764 A | 10/2000 | Scarsdale et al. | |
| 6,142,878 A | 11/2000 | Barin | |
| 6,164,910 A | 12/2000 | Mayleben | |
| 6,202,702 B1 | 3/2001 | Ohira | |
| 6,208,098 B1 | 3/2001 | Kume | |
| 6,254,462 B1 | 7/2001 | Kelton | |
| 6,271,637 B1 | 8/2001 | Kushion | |
| 6,273,193 B1 * | 8/2001 | Hermann | E21B 7/128 166/350 |
| 6,315,523 B1 | 11/2001 | Mills | |
| 6,477,852 B2 | 11/2002 | Dodo | |
| 6,484,490 B1 | 11/2002 | Olsen | |
| 6,491,098 B1 | 12/2002 | Dallas | |
| 6,529,135 B1 | 3/2003 | Bowers et al. | |
| 6,776,227 B2 | 8/2004 | Beida | |
| 6,802,690 B2 | 10/2004 | Han | |
| 6,808,303 B2 | 10/2004 | Fisher | |
| 6,931,310 B2 | 8/2005 | Shimizu et al. | |
| 6,936,947 B1 | 8/2005 | Leijon | |
| 7,082,993 B2 | 8/2006 | Ayoub | |
| 7,104,233 B2 | 9/2006 | Ryczek et al. | |
| 7,170,262 B2 | 1/2007 | Pettigrew | |
| 7,173,399 B2 | 2/2007 | Sihler | |
| 7,308,933 B1 * | 12/2007 | Mayfield | E21B 19/06 166/70 |
| 7,312,593 B1 | 12/2007 | Streicher et al. | |
| 7,336,514 B2 | 2/2008 | Amarillas | |
| 7,445,041 B2 | 11/2008 | O'Brien | |
| 7,494,263 B2 | 2/2009 | Dykstra et al. | |
| 7,500,642 B2 | 3/2009 | Cunningham | |
| 7,525,264 B2 | 4/2009 | Dodge | |
| 7,563,076 B2 | 7/2009 | Brunet | |
| 7,581,379 B2 | 9/2009 | Yoshida | |
| 7,675,189 B2 | 3/2010 | Grenier | |
| 7,683,499 B2 | 3/2010 | Saucier | |
| 7,717,193 B2 | 5/2010 | Egilsson et al. | |
| 7,755,310 B2 | 7/2010 | West et al. | |
| 7,807,048 B2 | 10/2010 | Collette | |
| 7,835,140 B2 | 11/2010 | Mori | |
| 7,845,413 B2 | 12/2010 | Shampine et al. | |
| 7,926,562 B2 | 4/2011 | Poitzsch | |
| 7,894,757 B2 | 7/2011 | Keast | |
| 7,977,824 B2 | 7/2011 | Halen et al. | |
| 7,984,757 B1 | 7/2011 | Keast | |
| 8,037,936 B2 | 10/2011 | Neuroth | |
| 8,054,084 B2 | 11/2011 | Schulz et al. | |
| 8,083,504 B2 | 12/2011 | Williams | |
| 8,096,354 B2 | 1/2012 | Poitzsch | |
| 8,096,891 B2 | 1/2012 | Lochtefeld | |
| 8,139,383 B2 | 3/2012 | Efraimsson | |
| 8,146,665 B2 | 4/2012 | Neal | |
| 8,154,419 B2 | 4/2012 | Daussin et al. | |
| 8,232,892 B2 | 7/2012 | Overholt et al. | |
| 8,261,528 B2 | 9/2012 | Chillar | |
| 8,272,439 B2 | 9/2012 | Strickland | |
| 8,310,272 B2 | 11/2012 | Quarto | |
| 8,354,817 B2 | 1/2013 | Yeh et al. | |
| 8,474,521 B2 | 7/2013 | Kajaria | |
| 8,534,235 B2 | 9/2013 | Chandler | |
| 8,573,303 B2 | 11/2013 | Kerfoot | |
| 8,596,056 B2 | 12/2013 | Woodmansee | |
| 8,616,005 B1 | 12/2013 | Cousino | |
| 8,616,274 B2 | 12/2013 | Belcher et al. | |
| 8,646,521 B2 * | 2/2014 | Bowen | B08B 9/055 166/70 |
| 8,692,408 B2 | 4/2014 | Zhang et al. | |
| 8,727,068 B2 | 5/2014 | Bruin | |
| 8,760,657 B2 | 6/2014 | Pope | |
| 8,774,972 B2 | 7/2014 | Rusnak et al. | |
| 8,789,601 B2 | 7/2014 | Broussard | |
| 8,800,652 B2 | 8/2014 | Bartko | |
| 8,807,960 B2 | 8/2014 | Stephenson | |
| 8,838,341 B2 | 9/2014 | Kumano | |
| 8,851,860 B1 | 10/2014 | Mail | |
| 8,857,506 B2 | 10/2014 | Stone, Jr. | |
| 8,899,940 B2 | 12/2014 | Leugemors et al. | |
| 8,905,056 B2 | 12/2014 | Kendrick | |
| 8,905,138 B2 | 12/2014 | Lundstedt et al. | |
| 8,997,904 B2 | 4/2015 | Cryer | |
| 9,018,881 B2 | 4/2015 | Mao et al. | |
| 9,051,822 B2 | 6/2015 | Ayan | |
| 9,067,182 B2 | 6/2015 | Nichols | |
| 9,103,193 B2 | 8/2015 | Coli | |
| 9,119,326 B2 | 8/2015 | McDonnell | |
| 9,121,257 B2 | 9/2015 | Coli et al. | |
| 9,140,110 B2 | 9/2015 | Coli et al. | |
| 9,160,168 B2 | 10/2015 | Chapel | |
| 9,322,239 B2 | 4/2016 | Angeles Boza et al. | |

(56) References Cited

U.S. PATENT DOCUMENTS

| | | |
|---|---|---|
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,728,354 B2 | 8/2017 | Skolozdra |
| 9,738,461 B2 | 8/2017 | DeGaray |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,309,205 B2 | 6/2019 | Randall |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,436,026 B2 | 10/2019 | Ounadjela |
| 2002/0169523 A1 | 11/2002 | Ross et al. |
| 2003/0056514 A1 | 3/2003 | Lohn |
| 2003/0138327 A1 | 7/2003 | Jones et al. |
| 2004/0040746 A1 | 3/2004 | Niedermayr et al. |
| 2004/0102109 A1 | 5/2004 | Cratty et al. |
| 2004/0167738 A1 | 8/2004 | Miller |
| 2005/0061548 A1* | 3/2005 | Hooper .................. E21B 19/20 |
| | | 175/52 |
| 2005/0116541 A1 | 6/2005 | Seiver |
| 2005/0274508 A1 | 12/2005 | Folk |
| 2006/0052903 A1 | 3/2006 | Bassett |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1* | 2/2008 | Blount .................. E21B 17/20 |
| | | 166/380 |
| 2008/0112802 A1 | 5/2008 | Orlando |
| 2008/0137266 A1 | 6/2008 | Jensen |
| 2008/0208478 A1 | 8/2008 | Ella et al. |
| 2008/0217024 A1 | 9/2008 | Moore |
| 2008/0264625 A1 | 10/2008 | Ochoa |
| 2008/0264649 A1 | 10/2008 | Crawford |
| 2009/0045782 A1 | 2/2009 | Datta |
| 2009/0065299 A1 | 3/2009 | Vito |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0145611 A1* | 6/2009 | Pallini, Jr. ............. E21B 19/004 |
| | | 166/355 |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0061855 A1 | 3/2011 | Case et al. |
| 2011/0085924 A1 | 4/2011 | Shampine |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0085541 A1 | 4/2012 | Love |
| 2012/0127635 A1 | 5/2012 | Grindeland |
| 2012/0205301 A1 | 8/2012 | McGuire et al. |
| 2012/0205400 A1 | 8/2012 | DeGaray et al. |
| 2012/0222865 A1* | 9/2012 | Larson .................. E21B 33/038 |
| | | 166/340 |
| 2012/0232728 A1 | 9/2012 | Karimi et al. |
| 2012/0247783 A1* | 10/2012 | Berner, Jr. ............ E21B 19/002 |
| | | 166/355 |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0199617 A1 | 8/2013 | DeGaray et al. |
| 2013/0233542 A1 | 9/2013 | Shampine |
| 2013/0306322 A1 | 11/2013 | Sanborn et al. |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1 | 1/2015 | Vicknair |
| 2015/0053426 A1* | 2/2015 | Smith .................. E21B 15/003 |
| | | 166/381 |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |

(56) References Cited

U.S. PATENT DOCUMENTS

| | | |
|---|---|---|
| 2015/0252661 A1 | 9/2015 | Glass |
| 2015/0300145 A1 | 10/2015 | Coli et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne et al. |
| 2016/0265457 A1 | 9/2016 | Stephenson |
| 2016/0273328 A1 | 9/2016 | Oehring |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0051732 A1 | 2/2017 | Hemandez et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0145918 A1 | 5/2017 | Oehring |
| 2017/0146189 A1 | 5/2017 | Herman |
| 2017/0159570 A1 | 6/2017 | Bickert |
| 2017/0218727 A1 | 8/2017 | Oehring |
| 2017/0218843 A1 | 8/2017 | Oehring |
| 2017/0222409 A1 | 8/2017 | Oehring |
| 2017/0226839 A1 | 8/2017 | Broussard |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0328179 A1 | 11/2017 | Dykstra |
| 2017/0369258 A1 | 12/2017 | DeGaray |
| 2018/0028992 A1 | 2/2018 | Stegemoeller |
| 2018/0038216 A1 | 2/2018 | Zhang |
| 2018/0156210 A1 | 6/2018 | Oehring |
| 2018/0183219 A1 | 6/2018 | Oehring |
| 2018/0216455 A1 | 8/2018 | Andreychuk |
| 2018/0245428 A1 | 8/2018 | Richards |
| 2018/0258746 A1 | 9/2018 | Broussard |
| 2018/0274446 A1 | 9/2018 | Oehring |
| 2018/0320483 A1 | 11/2018 | Zhang |
| 2018/0363437 A1 | 12/2018 | Coli |
| 2019/0003329 A1 | 1/2019 | Morris |
| 2019/0010793 A1 | 1/2019 | Hinderliter |
| 2019/0063309 A1 | 2/2019 | Davis |
| 2019/0100989 A1 | 4/2019 | Stewart |
| 2019/0112910 A1 | 4/2019 | Oehring |
| 2019/0120024 A1 | 4/2019 | Oehring |
| 2019/0128080 A1 | 5/2019 | Ross |
| 2019/0162061 A1 | 5/2019 | Stepheson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |

FOREIGN PATENT DOCUMENTS

| | | |
|---|---|---|
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| JP | 2004264589 | 9/2004 |
| WO | 2016/144939 | 9/2016 |
| WO | 2016/160458 | 10/2016 |

OTHER PUBLICATIONS

Non-Final Office Action issued in corresponding U.S. Appl. No. 15/293,681 dated Feb. 16, 2017.

Non-Final Office Action issued in corresponding U.S. Appl. No. 15/294,349 dated Mar. 14, 2017.

Final Office Action issued in corresponding U.S. Appl. No. 15/145,491 dated Jan. 20, 2017.

Non-Final Office Action issued in corresponding U.S. Appl. No. 15/145,443 dated Feb. 7, 2017.

Notice of Allowance issued in corresponding U.S. Appl. No. 15/217,040 dated Mar. 28, 2017.

Notice of Allowance issued in corresponding U.S. Appl. No. 14/622,532 dated Mar. 27, 2017.

Non-Final Office Action issued in corresponding U.S. Appl. No. 15/291,842 dated Jan. 6, 2017.

Final Office Action issued in corresponding U.S. Appl. No. 14/622,532 dated Dec. 7, 2016.

Non-Final Office Action issued in corresponding U.S. Appl. No. 14/622,532 dated May 17, 2016.

Final Office Action issued in corresponding U.S. Appl. No. 14/622,532 dated Dec. 21, 2015.

Non-Final Office Action issued in corresponding U.S. Appl. No. 14/622,532 dated Aug. 5, 2015.

Non-Final Office Action issued in corresponding U.S. Appl. No. 15/145,491 dated Sep. 12, 2016.

Non-Final Office Action issued in corresponding U.S. Appl. No. 15/217,040 dated Nov. 29, 2016.

Non-Final Office Action issued in corresponding U.S. Appl. No. 15/235,788 dated Dec. 14, 2016.

Non-Final Office Action issued in corresponding U.S. Appl. No. 15/145,491 dated May 15, 2017.

(56) References Cited

OTHER PUBLICATIONS

Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action dated Feb. 12, 2019 in related U.S. Appl. No. 16/170,695.
International Search Report and Written Opinion dated Feb. 15, 2019 in related PCT Patent Application No. PCT/US18/63977.
International Search Report and Written Opinion dated Mar. 5, 2019 in related PCT Patent Application No. PCT/US18/63970.
Non-Final Office Action dated Feb. 25, 2019 in related U.S. Appl. No. 16/210,749.
Non-Final Office Action dated Mar. 6, 2019 in related U.S. Appl. No. 15/183,387.
Office Action dated Jan. 30, 2019 in related Canadian Patent Application No. 2,936,997.
Office Action dated Mar. 1, 2019 in related Canadian Patent Application No. 2,943,275.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
International Search Report and Written Opinion dated Jul. 9, 2019 in corresponding PCT Application No. PCT/US2019/027584.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Final Office Action issued in corresponding U.S. Appl. No. 16/210,749 dated Jun. 11, 2019.
Canadian Office Action dated May 30, 2019 in corresponding CA Application No. 2,833,711.
Canadian Office Action dated Jun. 20, 2019 in corresponding CA Application No. 2,964,597.
International Search Report and Written Opinion dated Jul. 9, 2019 in related PCT Application No. PCT/US2019/027584.
Office Action dated Jun. 7, 2019 in related U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
Office Action dated Dec. 6, 2019 in related U.S. Appl. No. 16/564,186.
International Search Report and Written Opinion dated Jan. 2, 2020 in related PCT Application No. PCT/US19/55325.
International Search Report and Written Opinion dated Nov. 26, 2019 in related PCT Application No. PCT/US19/51018.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.

\* cited by examiner

RISER ASSIST FOR WELLSITES

RELATED APPLICATIONS

This Application is related to and claims benefit of priority from U.S. Provisional Application No. 62/731,501, filed Sep. 14, 2018, entitled "Riser Assist For Wellsites," which is incorporated herein for all intents and purposes in its entirety.

BACKGROUND

1. Field of Invention

The present disclosure generally relates to wellhead systems. In particular, the present disclosure relates to an apparatus and method for hanging risers in wellheads.

2. Related Technology

Mobile systems, including cranes and manual operators are used in wellsites to assist with installation and maintenance of wellheads and wellbores in subterranean fissures and in sea-based regions of a hydrocarbon producing environment. The processes used in the websites rely on very heavy machinery and the use of a large amount of complex equipment, including trailers and trucks, to transport the engines to and from a wellsite. In addition, such machinery is operated by one or more human operators and subjects a human operator to risks due to unpredictable and unforeseen actions of certain control mechanisms. In addition, there may be substantial time requirements and complex capability requirements for the human operator to manage placement of wellhead features into required positions for safe operation of the wellhead.

For example, considerable time is spent hanging risers on wellheads. In addition multiple operators may be required to coordinate this process. The hydrocarbon producing environment may also be hazardous and subjects human operations to unnecessary exposure to the elements. There may be very little room for error. Accuracy is important to prevent side loading and binding of connections during riser hanging processes, and to achieve maximum allowed freedom in each line of the machinery. An existing process for hanging risers on the well head uses a lifting strap and tag lines. Adjustment of the angle of the riser in this existing process may be difficult, without using multiple operators to manually interact with at least a portion of the riser assembly, in the area of the riser assembly, and without the use of the tag line. This existing process also, then, requires the use of an angle finder to find the angle of the risers as the operation, using the tag lines, is ongoing.

SUMMARY

Herein disclosed are examples of an apparatus and a method using the apparatus to resolve the above-identified issues in the use of cranes and tag lines to control the process of hanging risers for use with wellheads.

The apparatus includes a first elongated member with a provision for a first external mechanical coupling at a distal location on the first elongated member. The first external mechanical coupling allows a hoist to be associated with the apparatus. A second elongated member is mechanically coupled to the first elongated member at proximal locations on the first elongated member and the second elongated member. A third member is mechanically coupled to a first portion of the first elongated member. Further, the first portion includes a damping system. The third member includes a fourth member that can move through at least a second portion of a length of the second elongated member. Mechanical couplers are provided with association to the second elongated member. The mechanical couplers are for a second external mechanical coupling. The second external mechanical coupling allows the apparatus to be associated with the riser. The use of a method with the apparatus (and the apparatus itself) allows a crane or other hoist to control riser motions with more accuracy and with improved safety for associating the riser with a wellhead, for instance.

The method or a process herein enables lifting a riser associated with a wellhead. A sub-process of the method provides an apparatus with a first elongated member having a provision for an external mechanical coupling at a distal location. The method mechanically hinges a second elongated member to the first elongated member at proximal locations on the first elongated member and the second elongated member. The method further hinges, mechanically, a third member to a first portion of the first elongated member is required. The first portion includes a damping system. The third member is provided with a fourth member that moves through at least a first portion of a length of the second elongated member. A sub-process of the method enables mechanical coupling for the apparatus to the riser using at least one mechanical coupler on the second elongated member.

BRIEF DESCRIPTION OF THE DRAWINGS

Some of the features and benefits of the present invention having been stated, others will become apparent as the description proceeds when taken in conjunction with the following accompanying drawings.

DETAILED DESCRIPTION OF THE DISCLOSURE

Figure 1:
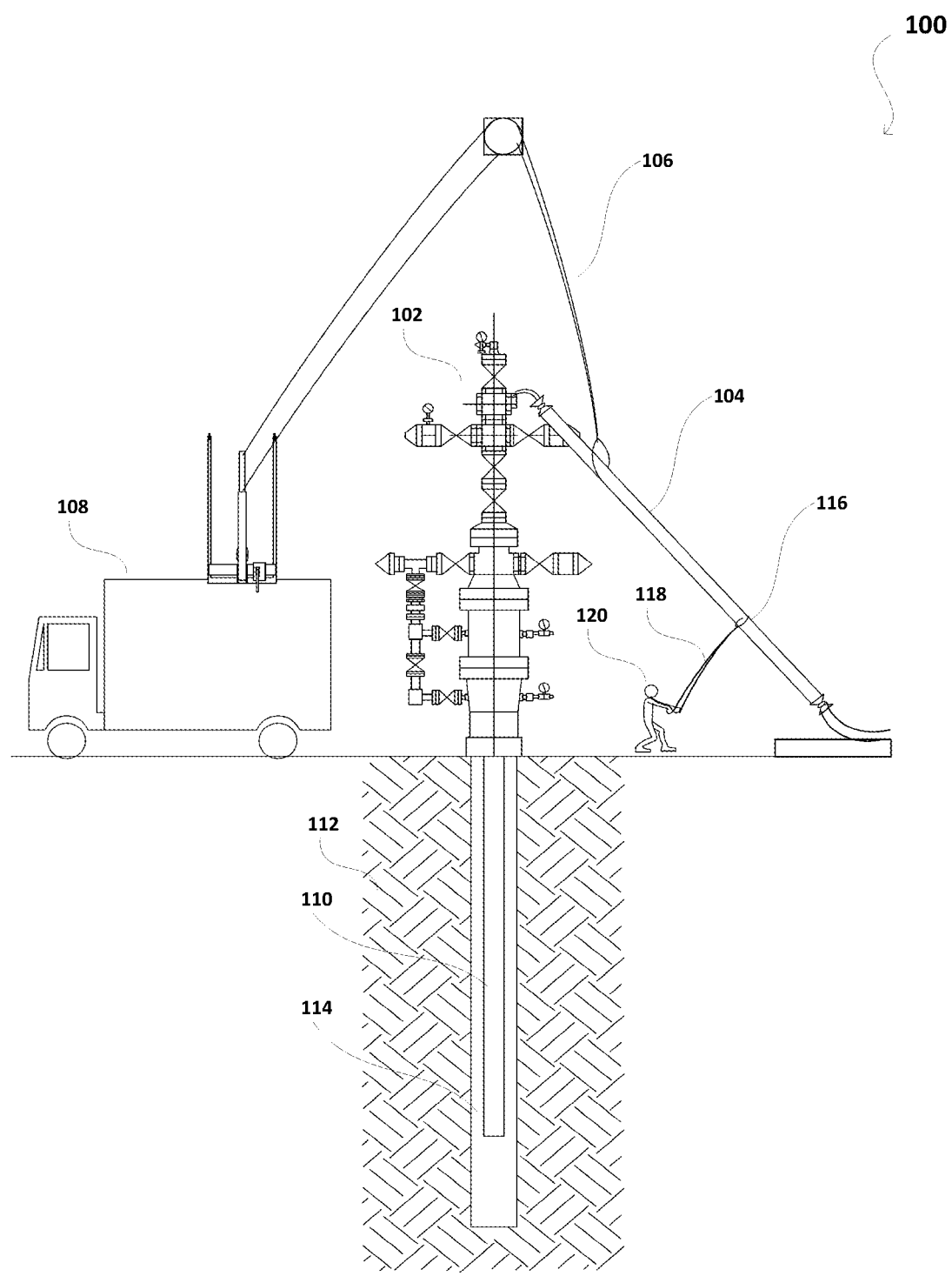
FIG. 1 is a schematic of an example riser hanging system in accordance with known aspects.

So that the manner in which the features and advantages of the embodiments of hydraulic fracturing system and associated methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The present disclosure uses a riser hanging tool or system, which may also be used for other aspects of the wellhead processes or in the wellsites for lifting purposes. The riser hanging tool enables management or control of angles between the riser being lifted into place and the wellhead, for instance. The maximum allowable angle to prevent damage to the riser, for example, may be identified from an original equipment manufacture's specifications (OEM specifications) and may be adjusted into the riser hanging tool. In an example, a damping system in the riser hanging tool is able to use angle specifications (or related damping values predetermined for the damping system) to control the movement of the riser in relation to the wellhead when a hoist moves the riser into place with the wellhead. In an aspect, the damping system utilizes a hydraulic cylinder. An adjustment range for the hydraulic cylinder is calculated from the angle of operation allowed to the riser. For example, the adjustment range may be within OEM's recommendation of 35 degrees+/−5%. With the riser hanging tool, a single operator may operate the hydraulic cylinder. The single operator may be in a man basket overlooking the wellhead. This eliminates hazardous conditions by not requiring the operator to remain under or near the suspended load (e.g., riser in this example). The use of the riser hanging tool also promotes accuracy as the adjustment made to the angle requirements ensure a quick and accurate placement of the riser to the wellhead. In addition, the riser hanging tool may be installed by a quick latch system that can be quickly disconnected after installation and connected to the next riser, for instance.

FIG. 1 is a schematic of an example riser hanging system 100 in accordance with known aspects. A hoisting system 108, such as mounted on a truck, may be used to hoist riser 104 for hanging in place with the wellhead 102. The hoisting system 108 may rely on cables 106 to hang the riser 104. In the riser hanging system 100, there may be a requirement for one or more human operators, such as operator 120, to use tag lines 118, with attachment 116 to the riser, to control the movement of the riser 104, while the hoisting system 108 makes simultaneous movements. The wellsite may include casing 114 driven into the subterranean region 112 and with a tubing riser 110 supporting the extraction of hydrocarbon products, for instance.

Figure 2:
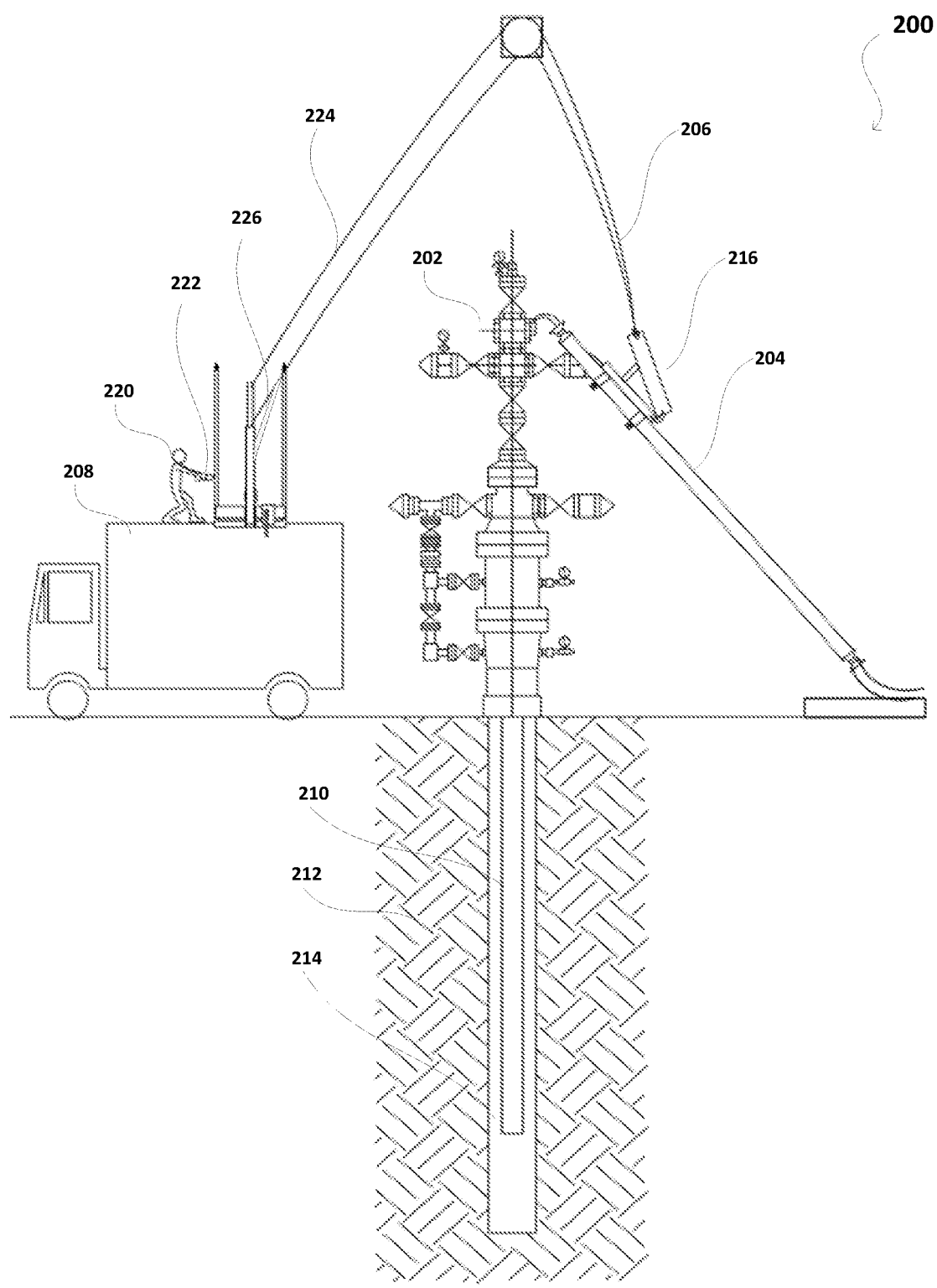
FIG. 2 is a schematic of an example riser hanging system in accordance with aspects of this disclosure.

FIG. 2 is a schematic of an example riser hanging system 200, according to aspects of this disclosure. The riser hanging system 200 relies on the riser hanging tool 216 to hang riser 204 in place with wellhead 202. The hoisting system 208 relies on cables 206 to hang the riser 204 with the wellhead 202. The riser hanging system 200, however, does not require the operator 220 to be in a vulnerable or dangerous position in the area of the riser as it is being hung. In addition, the use of the riser hanging tool 216 with its damping system, as discussed in more detail in the below aspects, provides accuracy and control over the process to hang riser 204 with the wellhead 202. The wellsite may include casing 214 driven into the subterranean region 212 and with a tubing riser 210 supporting the hydrocarbon products. This process reduces the risk of premature iron union failures of the risers to the wellhead due to fatigue and eliminates operators being exposed to the dangerous swinging overhead loads. Operator 220, in an example, may operate a hydraulic jack 226 at a location in a man basket using controls 222, away from the riser 204. A person of ordinary skill would recognize the requirement for the hydraulic jack 222 to move an arm 224 of the hoist 206.

Figure 3:
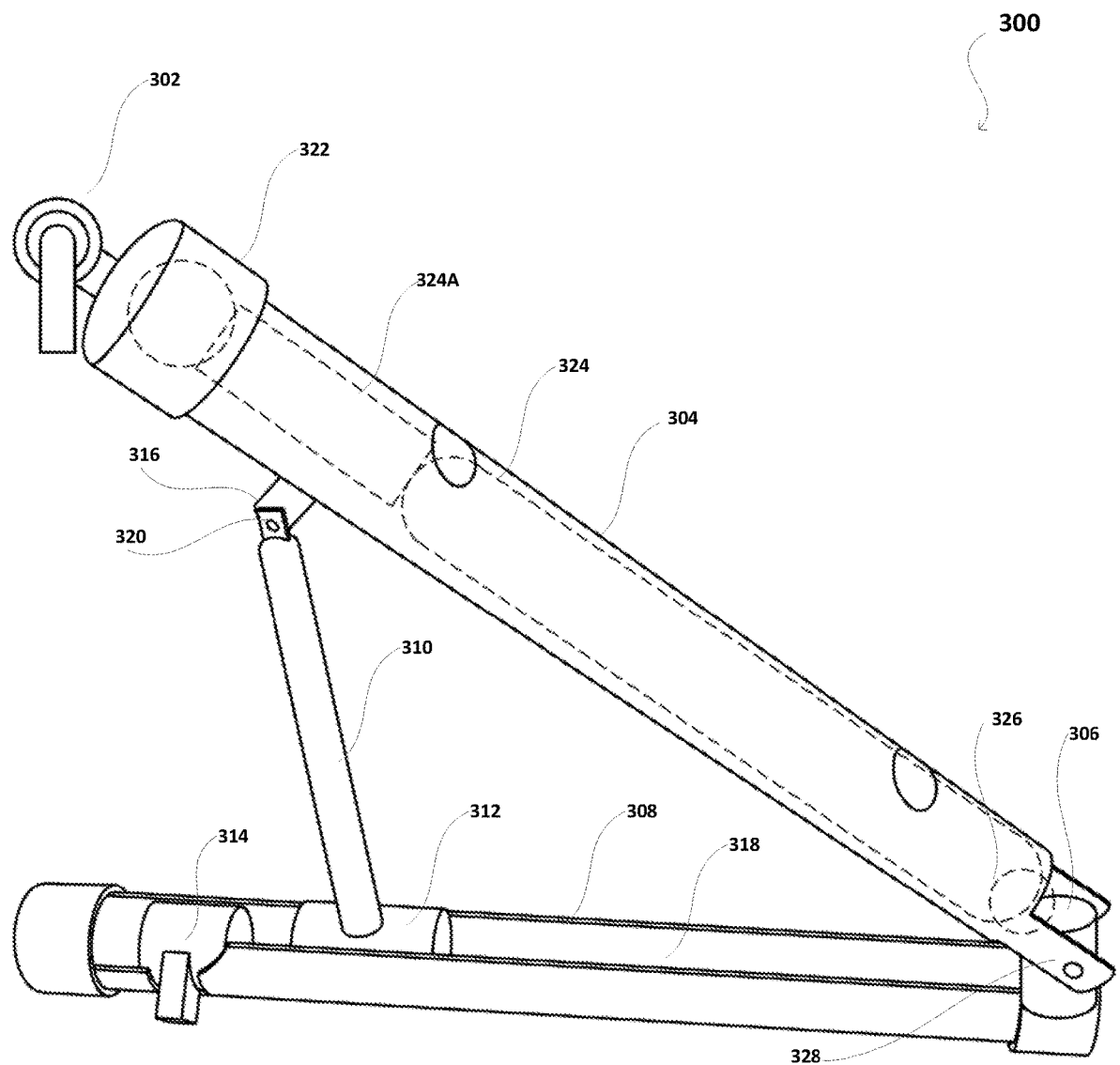
FIG. 3 illustrates of an example riser hanging tool to use in a riser hanging system, in accordance with aspects of this disclosure.

FIG. 3 is an illustration of an example riser hanging tool 300 for use in a riser hanging system, such as system 200, in accordance with aspects of this disclosure. The example riser hanging tool 300 may be an apparatus with various fixed and/or moving parts. For example, the riser hanging tool 300 includes a first elongated member 304 with a first provision 302 for an external mechanical coupling at a distal location on the first elongated member 304. A second elongated member 308 is provided for being mechanically coupled to the first elongated member 304. The riser hanging tool 300 is illustrated with the first elongated member 304 and the second elongated member 308 being hollow tubular members. However, the shape of the elongated members may be rectangular or square or any other reliable shape, by cross-section to support the loads and stresses at issue.

The mechanical coupling at second provision 306, between the first and the second elongated members 304, 308, may be at proximal locations on the first elongated member 304 and the second elongated member 308. The mechanical coupling at second provision 306 is achieved by a hinge functioning as the second provision 306. The proximal locations are distinct from the distal location of the first provision 302, which enables the external mechanical coupling between the riser hanging tool 300 and an external component. In an example, the first provision 302 may be a hooking part of a hoisting system that hooks the riser hanging tool 300 to an attached riser (not presently in the illustration of FIG. 3). A third member 310 is mechanically coupled to a first portion of the first elongated member 304. This may be a direct or indirect mechanical coupling. In an example, the first portion includes a damping system. The damping system may be or may include a hydraulic cylinder 324 (shown with dotted lines to represent that it may be within the first elongated member 304). An extension 316 from the hydraulic cylinder is provided for the mechanical coupling to the third member. In the example riser hanging tool 300, the hydraulic cylinder 324 may form the first portion of the first elongated member 304 or may be part of the first elongated member 304. In such a case, the first elongated member 304 may include a cap 322 for the first provision 302. The cap 322 forms another portion or may be an integral part of the first elongated member 304. The cap 322 may be integrally welded, for instance, to a body portion of the first elongated member 304. A person of ordinary skill would, therefore, recognize that the hydraulic cylinder may be fixed to the first elongated member 304 or may be a part of the first elongated member 304, but may also be removable.

The third member 310 may include a fourth member 312. The fourth member 312 is illustrated as a cylinder or specifically shaped member capable of traveling or moving in a hollow portion 318 of the second elongated members 308. This allows the fourth member 312 to move through at least a second portion (e.g., the hollow portion) of a length of the second elongated member 308. Further, one or more mechanical couplers may be associated with the second elongated member 308. One such coupler is marked by reference numeral 314, but a person of ordinary skill would recognize that multiple such couplers may be located throughout the second elongated member 308. The coupler 314 is provided for a second external mechanical coupling of the riser hanging tool 300 to the riser. In an implementation, when the riser hanging tool 300 is connected to the riser at the second elongated member 308 and when it is suspended by a hoist located at the provision 302, then the hydraulic cylinder 324 of the damping system is extended, such as by a piston 324A therein, and the extension 316 moves with the piston or spring of the hydraulic cylinder to move and/or rotate the third member 310. The extension 316 may be connected directly or indirectly to the piston 324A of the hydraulic cylinder 324. The provision 302 may be internally connected to the piston 324A, as well. In the implementation of FIG. 3, the fourth member 312 may be fixed or movable within the hollow portion 318. The fixed or movable aspects may be based in part on the angle of movement allowed to the riser relative to the hoist or the wellhead that is illustrated in FIG. 2. As sudden movements of the hoist are damped, it may also be the case that the corresponding movement applied to the third member 310 maintains the second elongated member 308 at an angle intended with respect to the first elongated member 304.

The hydraulic cylinder 324 may be fixed within the first elongated member 304 and form part of the damping system of the first portion of the first elongated member 304. Further, the hydraulic cylinder 324 may include a hinge 320 for the mechanical coupling with the third member 310. In an example, the riser hanging tool 300 relies on the hydraulic cylinder 324 being within the first elongated member 304 to move the third member 310 in an angle about the hinge 320.

Figure 5:
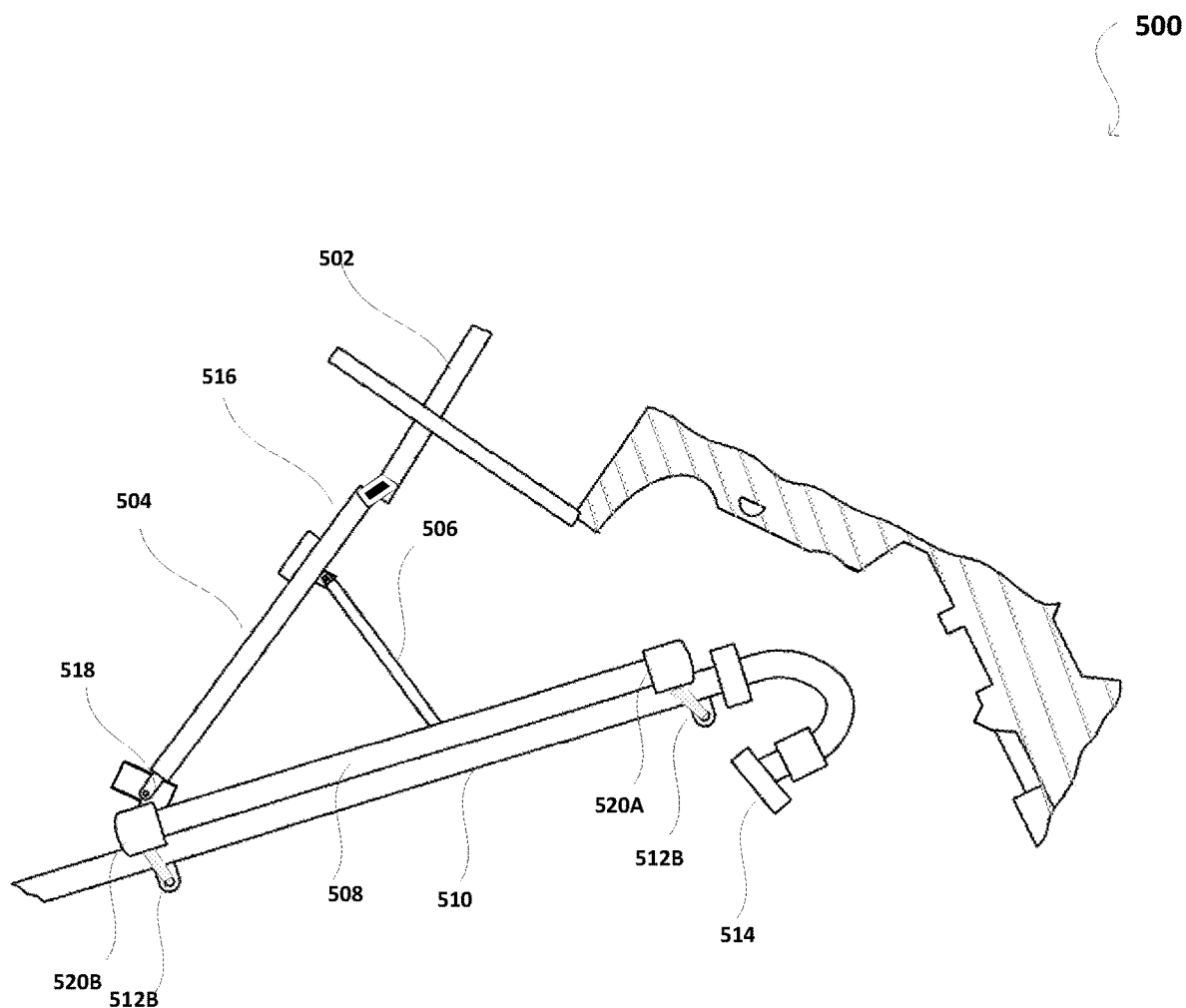

Further, an adjusting mechanism 326 for the hydraulic cylinder allows an operator (e.g., operator 220) to control the angle to and/or the speed with which the third member is moved. For example, the adjusting mechanism 326 may stiffen or restrict movement of a piston 324A in cylinder 324 to adjust the angle and/or the speed with which the third member is moved. The adjusting mechanism 326 may be a screw, a limiting lever, a fluid injector port (for adjusting a cylinder fluid), or other applicable feature that may be readily understood by a person of ordinary skill upon reading the present disclosure. Further, the adjusting mechanism may be located elsewhere, such as in cap 322, within the hollow area of the first elongation member 304, at the extension 316, or the second provision 306. The portion 318 of length of the second elongated member 308 is made hollow to support the fourth member 312 moving therein. This allows the first and the second elongated members 304, 308 to come closer together or move apart, along with some induced damping from the hydraulic cylinder as the riser is being moved. As such, accuracy is maintained by the damped movements of the riser when the hoisting system is moving the riser via the riser hanging tool 300. The sudden movements are reduced and more precise movements help the operators make connections required to hang the riser with the wellhead. Further, the mechanical coupler(s) 314 have latching features for latching around the riser of the wellhead. An example is provided via couplers 512A, 512B in FIG. 5. In an example, the latching features are integral to the couplers as illustrated in FIG. 5. As such, reference to couplers is used interchangeably with reference to latching features or a latching system.

The riser hanging tool 300 enables certain angles of movement for the riser, which may be determined from an Original Equipment Manufacturer's (OEM's) suggested specifications for the rise, for instance. The angles may be used to adjust the hydraulic cylinder 324 so that movement of its related piston 324A within the hydraulic cylinder 324, are adjusted, in turn. The amount of movement corresponds to the angular displacement allowed for the riser as it is hoisted into position. The adjustment, in an instance, may be in a range within the OEM's recommendation. In an example, the adjustment may be 35 degrees+/−5%. Thereafter one operator (e.g., operator 220) may be needed to operate a hydraulic jack 222, as illustrated in FIG. 2, at a location in a man basket, away from the riser 204. This eliminates a requirement for operators to stand close to a suspended riser. The riser hanging tool 300 may include a quick latch system 512A, 512B (illustrated as integral to or separate from couplers 520A, 520B in FIG. 5, for instance) that is located on the second elongated member 308 that can be quickly connected and disconnected with the riser pipe, for instance.

Figure 4:
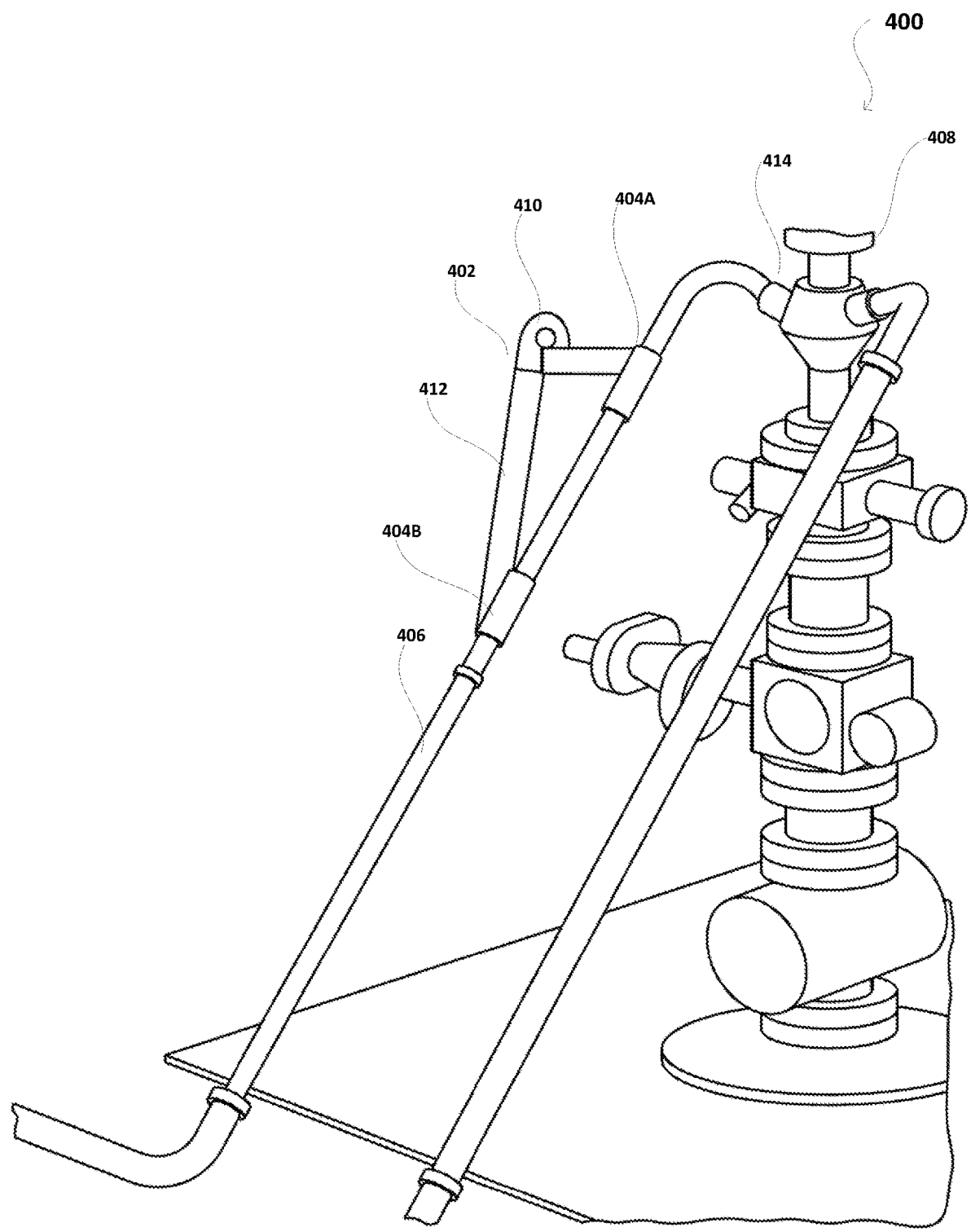
FIGS. 4 and 5 illustrate example riser hanging systems in different applications or stages of an application, in different views, according to aspects of this disclosure.

FIGS. 4 and 5 illustrate example riser hanging systems 400, 500 in different applications or stages of an application, in different views, according to aspects of this disclosure. FIG. 4 is a side perspective view of the riser hanging system 400 connected in a wellsite, for instance. FIG. 5 is a bottom perspective view of the riser hanging system 400 in an application for hoisting a riser 510 for connection in a wellsite, for instance. In these figures, the riser hanging systems (e.g., systems 400, 500) rely on an example riser hanging tool (e.g., riser hanging tool 300; 402) to hang riser 406 with wellhead 408. The riser hanging tool 402 includes the second elongated member (affixed behind the riser 406 and not show) that uses latches 404A, 404B on couplers (also not shown) for fixing with the riser 406 in a wellsite. The first elongated member 412 is illustrated with its distal end having the first provision 410 for the external mechanical coupling with a hoist of a riser hanging system. This may be a hooking part of the riser hoisting system that uses the riser tool 402 to hang the attached riser 406 with the wellhead 408 at its appropriate coupling point, such as at a reference area 414, in this example.

In FIG. 5, the example riser hanging system 500 is illustrated with the hoisting system 502 in the process of hanging riser 510. The riser 510 is not yet hung with a wellhead and remains uncoupled at its coupling point 514. The hoisting system 502 includes cables and an associated hoisting system, such as a crane or cabling system, to move the riser hanging tool 504 with the riser 510 using a mechanical coupling as referenced in the examples of FIGS. 2-4. The riser hanging tool 504 is illustrated with its second elongated member 508 attached to the riser 510 via latches (integral to or separate from couplers 520A, 520B) 512A and 512B. Latches 512A, 512B are removable to disassociate the tool 504 from the riser 510 after the riser is hung with the wellhead or after removal of the riser from the wellhead. The first elongated member 516 is illustrated in mechanical coupling with the second elongated member 508 via hinge 518 (also illustrated as reference numeral 328 in FIG. 3).

Figure 6:
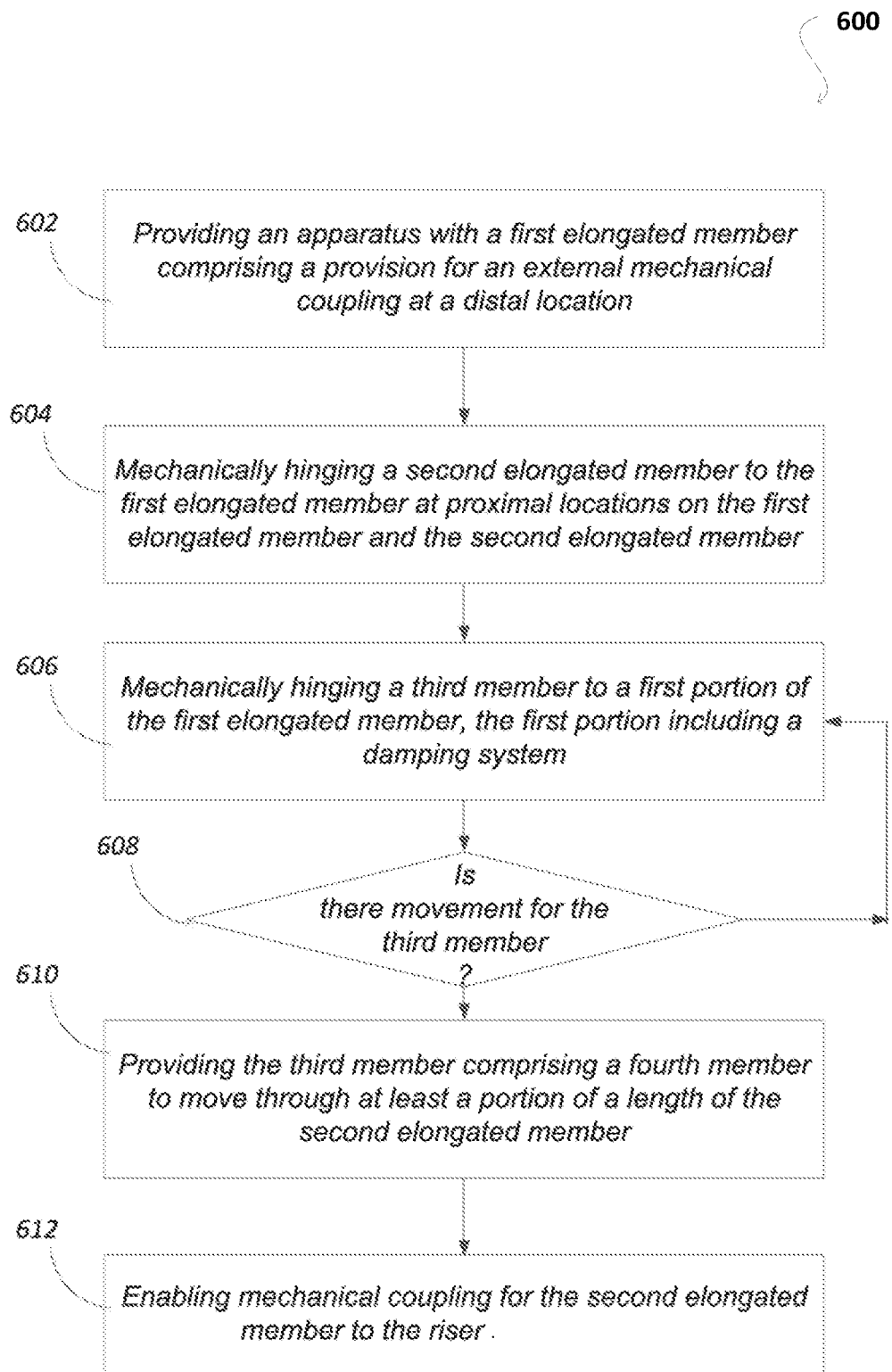
FIG. 6 is an example process for a riser hanging tool according to aspects of the embodiments herein.

FIG. 6 is an example process or method 600 for a riser hanging tool according to aspects of the embodiments herein. The process or method 600 is for providing a riser lifting tool and for lifting a riser associated with a wellhead using the riser lifting tool. Sub-process 602 provides an apparatus, such as the riser lifting tool, having a first elongated member and a provision for an external mechanical coupling at a distal location. Sub-process 604 mechanically hinges a second elongated member to the first elongated member at proximal locations on the first elongated member and the second elongated member. Sub-process 606 mechanically hinges a third member to a first portion of the first elongated member. The first portion may include a damping system, such as the damping system discussed with respect to the examples throughout this disclosure and particularly with respect to FIG. 3. Sub-process 608 verifies that sufficient movement for the third member is achieved in relation to one or more of the first elongated member and the second elongated member. Sub-process 610 provides the third member with a fourth member in any form of a mechanical coupling, by fixed coupling or using another hinge for a movable coupling, for instance. The fourth member is able to move through at least a first portion of a length of the second elongated member. Sub-process 612 enable mechanical coupling for the apparatus to the riser using at least one mechanical coupler on the second elongated member. As such, the example process 600 illustrates a riser lifting tool constructed at the wellsite or at a manufacturing location, for instance, and also illustrates lifting a riser associated with a wellhead using the riser lifting tool. The method enables the manufacture and use of the apparatus by enabling the coupling of components by an operator to put together the apparatus and to use the apparatus at a wellsite.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

In the various embodiments of the disclosure described, a person having ordinary skill in the art will recognize that alternative arrangements of components, units, conduits, and fibers could be conceived and applied to the present invention. The singular forms "a," "an," and "the" include plural referents, unless the context clearly dictates otherwise.

The invention claimed is:

1. An apparatus for performing hoisting functions, the apparatus comprising:
   a first elongated member comprising a provision for a first external mechanical coupling at a distal location on the first elongated member;
   a second elongated member mechanically coupled to the first elongated member at proximal locations on the first elongated member and the second elongated member;
   a third member mechanically coupled to a first portion of the first elongated member, the first portion including a damping system;
   the third member comprising a fourth member, the fourth member to move through at least a second portion of a length of the second elongated member; and
   at least one mechanical coupler associated with the second elongated member for a second external mechanical coupling of the apparatus to a riser.

2. The apparatus of claim 1, wherein the first elongated member and the second elongated member are hollow tubular members.

3. The apparatus of claim 1, further comprising:
   a hydraulic cylinder fixed within or forming part of the first elongated member, the hydraulic cylinder forming part of the damping system of the first portion of the first elongated member, and the hydraulic cylinder comprising a first hinge for mechanical coupling with the third member.

4. The apparatus of claim 3, wherein the hydraulic cylinder is within the first elongated member to move the third member in an angle around the first hinge.

5. The apparatus of claim 3, further comprising:
   an adjusting mechanism for the hydraulic cylinder to control the angle and/or to control a speed with which the third member is moved.

6. The apparatus of claim 1, further comprising:
   the second portion of the second elongated member being a hollow area; and
   the fourth member comprised within the hollow area of the second elongated member.

7. The apparatus of claim 1, further comprising:
   the at least one mechanical coupler having a latching system for latching to the riser of the wellhead to form the second external mechanical coupling of the apparatus to the riser.

8. The apparatus of claim 1, further comprising:
   the second elongated member being hinged with a second hinge to the first elongated member.

9. A method for lifting a riser associated with a wellhead, the method comprising:
   providing an apparatus with a first elongated member comprising a provision for an external mechanical coupling at a distal location;
   mechanically hinging a second elongated member to the first elongated member at proximal locations on the first elongated member and the second elongated member;
   mechanically hinging a third member to a first portion of the first elongated member, the first portion including a damping system;
   providing the third member with a fourth member, the fourth member to move through at least a first portion of a length of the second elongated member; and
   enabling mechanical coupling for the apparatus to the riser using at least one mechanical coupler on the second elongated member.

10. The method of claim 9, further comprising:
    mechanically coupling the apparatus to the riser at the second elongated member;
    mechanically coupling the external mechanical coupling to a hoist; and
    hoisting the riser into position with the wellhead.

11. The method of claim 9, wherein the first elongated member and the second elongated member are hollow tubular members.

12. The method of claim 9, further comprising:
    providing a hydraulic cylinder as part of the damping system, within or as part of the first elongated member, the hydraulic cylinder comprising the first portion of the first elongated member mechanically hinged to the third member.

13. The method of claim 12, further comprising:
    moving, by the hydraulic cylinder that is the part of or that is within the first elongated member, the third member in an angle about a hinge affixed between the first elongated member and the third member.

14. The method of claim 13, further comprising:
adjusting a mechanism for the hydraulic cylinder to control the angle and/or to control a speed with which the third member is moved.

15. The method of claim 9, further comprising:
latching, using a latching system, the second elongated member to the riser for hoisting the riser into position with the wellhead.

\* \* \* \* \*